United States Patent
Jaffrennou et al.

(10) Patent No.: US 9,562,150 B2
(45) Date of Patent: Feb. 7, 2017

(54) SIZING COMPOSITION FOR MINERAL WOOL COMPRISING A SACCHARIDE, AN ORGANIC POLYCARBOXYLIC ACID AND A REACTIVE SILICONE, AND INSULATING PRODUCTS OBTAINED

(75) Inventors: Boris Jaffrennou, Paris (FR); Claudio Roncuzzi, Paris (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 0 days.

(21) Appl. No.: 13/262,901

(22) PCT Filed: Jun. 2, 2010

(86) PCT No.: PCT/FR2010/051075
§ 371 (c)(1),
(2), (4) Date: Oct. 24, 2011

(87) PCT Pub. No.: WO2010/139899
PCT Pub. Date: Dec. 9, 2010

(65) Prior Publication Data
US 2012/0070645 A1 Mar. 22, 2012

(30) Foreign Application Priority Data
Jun. 4, 2009 (FR) ..................... 09 02705

(51) Int. Cl.
| | | |
|---|---|---|
| *B32B 19/02* | (2006.01) | |
| *C08L 3/02* | (2006.01) | |
| *C09J 103/02* | (2006.01) | |
| *D04H 1/4218* | (2012.01) | |
| *D04H 1/64* | (2012.01) | |
| *D04H 3/004* | (2012.01) | |
| *D04H 3/12* | (2006.01) | |
| *C08K 5/092* | (2006.01) | |
| *C08L 83/04* | (2006.01) | |

(52) U.S. Cl.
CPC ............... *C08L 3/02* (2013.01); *C09J 103/02* (2013.01); *D04H 1/4218* (2013.01); *D04H 1/64* (2013.01); *D04H 3/004* (2013.01); *D04H 3/12* (2013.01); *C08K 5/092* (2013.01); *C08L 83/04* (2013.01); *Y10T 428/249921* (2015.04); *Y10T 428/2962* (2015.01)

(58) Field of Classification Search
CPC .......... C08K 5/092; C08L 5/00; C03C 25/321; C08G 63/668; C09J 103/00; C09J 103/02; C09J 105/00; D04H 1/4209; D04H 1/4218

USPC .......................................... 428/221; 106/205
See application file for complete search history.

(56) References Cited

U.S. PATENT DOCUMENTS

| | | |
|---|---|---|
| 5,318,990 A | 6/1994 | Strauss |
| 5,340,868 A | 8/1994 | Strauss et al. |
| 5,661,213 A | 8/1997 | Arkens et al. |
| 5,895,804 A | 4/1999 | Lee et al. |
| 5,932,689 A | 8/1999 | Arkens et al. |
| 5,977,232 A | 11/1999 | Arkens et al. |
| 6,071,994 A | 6/2000 | Hummerich et al. |
| 6,099,773 A | 8/2000 | Reck et al. |
| 6,146,746 A | 11/2000 | Reck et al. |
| 6,299,936 B1 | 10/2001 | Reck et al. |
| 6,331,350 B1 | 12/2001 | Taylor et al. |
| 2002/0091185 A1 | 7/2002 | Taylor et al. |
| 2002/0188055 A1 | 12/2002 | Chen et al. |
| 2003/0008978 A1 | 1/2003 | Chen et al. |
| 2004/0002567 A1 | 1/2004 | Chen et al. |
| 2005/0215153 A1 | 9/2005 | Cossement et al. |
| 2006/0111480 A1 | 5/2006 | Hansen et al. |
| 2006/0293440 A1* | 12/2006 | Tseitlin et al. ................ 524/557 |
| 2007/0142596 A1* | 6/2007 | Swift et al. .................. 527/312 |
| 2007/0270066 A1 | 11/2007 | Van Herwijnen et al. |
| 2009/0042030 A1* | 2/2009 | Douce et al. ................. 428/392 |
| 2009/0214864 A1* | 8/2009 | Riess et al. .................. 428/392 |
| 2010/0222459 A1* | 9/2010 | Kelly et al. .................... 524/17 |

FOREIGN PATENT DOCUMENTS

| | | | |
|---|---|---|---|
| EP | 990727 A1 * | 4/2000 | |
| WO | 01/96254 | 12/2001 | |
| WO | 2006/103377 | 10/2006 | |
| WO | WO 2007003822 A2 * | 1/2007 | |
| WO | 2008/089851 | 7/2008 | |

OTHER PUBLICATIONS

International Search Report mailed Oct. 20, 2010 in corresponding International Patent Application No. PCT/FR2010/051075.

* cited by examiner

*Primary Examiner* — Peter Y Choi
*Assistant Examiner* — Vincent A Tatesure
(74) *Attorney, Agent, or Firm* — Pillsbury Winthrop Shaw Pittman LLP

(57) ABSTRACT

A sizing composition for insulating products based on mineral wool, in particular on glass or on rock, includes: at least one saccharide, at least one organic polycarboxylic acid having a molar mass of less than or equal to 1000, and at least one reactive silicone. Furthermore, insulating products based on mineral fibers thus obtained and the process for the manufacture thereof are presented.

34 Claims, No Drawings

SIZING COMPOSITION FOR MINERAL WOOL COMPRISING A SACCHARIDE, AN ORGANIC POLYCARBOXYLIC ACID AND A REACTIVE SILICONE, AND INSULATING PRODUCTS OBTAINED

CROSS-REFERENCE TO RELATED APPLICATIONS

This application is the U.S. National Stage of PCT/FR2010/051075, filed Jun. 2, 2010, which in turn claims priority to French Application No. 0902705, filed Jun. 4, 2009. The content of both applications are incorporated herein by reference in their entirety.

The present invention relates to the field of thermal and/or acoustic insulating products based on mineral wool, in particular glass or rock, and on a formaldehyde-free organic binder.

The invention more particularly relates to a sizing composition capable of crosslinking to form the said organic binder, which includes at least one saccharide, at least one organic polycarboxylic acid having a molar mass of less than 1000 and at least one reactive silicone, to the process for the preparation of the said sizing composition and to the insulating products which result therefrom.

The manufacture of insulating products based on mineral wool generally comprises a stage of manufacture of the wool itself, which can be carried out by various processes, for example according to the known technique of fiberizing by internal or external centrifugation. The centrifugation consists in introducing the molten mineral material (glass or rock) into a centrifugal device comprising a multitude of small orifices, the material being projected towards the peripheral wall of the device under the action of the centrifugal force and escaping therefrom in the form of filaments. On leaving the centrifugal device, the filaments are drawn and carried towards a receiving member by a gas stream having a high temperature and a high speed, in order to form a web of fibres (or mineral wool) there.

In order to provide for the assembly of the fibres together and to make it possible for the web to have cohesion, a sizing composition comprising a thermosetting resin is projected onto the fibres, on the route between the outlet of the centrifugal device and the receiving member. The web of fibres coated with the size is subjected to a heat treatment, at a temperature generally of greater than 100° C., in order to bring abut the polycondensation of the resin and to thus obtain a thermal and/or acoustic insulating product having specific properties, in particular dimensional stability, tensile strength, thickness recovery after compression and homogeneous colour.

The sizing composition to be projected onto the mineral wool is generally provided in the form of an aqueous solution including the thermosetting resin and additives, such as a catalyst for the crosslinking of the resin, an adhesion-promoting silane, a dust-preventing mineral oil, and the like. The sizing composition is generally applied to the fibres by spraying.

The properties of the sizing composition depend largely on the characteristics of the resin. From the viewpoint of the application, it is necessary for the sizing composition to exhibit good sprayability and to be able to be deposited at the surface of the fibres in order to efficiently bind them.

The resin has to be stable for a given period of time before being used to form the sizing composition, which composition is generally prepared at the time of use by mixing the resin and the additives mentioned above.

At the regulatory level, it is necessary for the resin to be regarded as non-polluting, that is to say for it to comprise—and for it generate during the sizing stage or subsequently—as little as possible in the way of compounds which may be harmful to human health or to the environment.

The thermosetting resins most commonly used are phenolic resins belonging to the family of the resols. In addition to their good crosslinkability under the abovementioned thermal conditions, these resins are soluble in water, have a good affinity for mineral fibres, in particular glass fibres, and are relatively inexpensive.

These resols are obtained by condensation of phenol and formaldehyde, in the presence of a basic catalyst, in a formaldehyde/phenol molar ratio of greater than 1, so as to promote the reaction between the phenol and the formaldehyde and to reduce the level of residual phenol in the resin. The condensation reaction between the phenol and the formaldehyde is carried out while limiting the degree of condensation of the monomers, in order to avoid the formation of long, relatively water-insoluble, chains which reduce the dilutability. Consequently, the resin comprises a certain proportion of unreacted monomer, in particular formaldehyde, the presence of which is undesirable because of its known harmful effects.

For this reason, resol-based resins are generally treated with urea, which reacts with the free formaldehyde by trapping it in the form of nonvolatile urea-formaldehyde condensates. The presence of urea in the resin in addition brings a certain economic advantage as a result of its low cost because it is possible to introduce it in a relatively large amount without affecting the operating qualities of the resin, in particular without harming the mechanical properties of the final product, which significantly lowers the total cost of the resin.

Nevertheless, it has been observed that, under the temperature conditions to which the web is subjected in order to obtain crosslinking of the resin, the urea-formaldehyde condensates are not stable; they decompose with restoration of the formaldehyde and urea, in its turn at least partially decomposed to give ammonia, which are released into the atmosphere of the factory.

Regulations with regard to environmental protection, which are becoming more restrictive, are forcing manufacturers of insulating products to look for solutions which make it possible to further lower the levels of undesirable emissions, in particular of formaldehyde.

Solutions in which resols are replaced in sizing compositions are known and are based on the use of a carboxylic acid polymer, in particular an acrylic acid polymer.

In U.S. Pat. No. 5,340,868, the size comprises a polycarboxylic polymer, a β-hydroxyamide and an at least trifunctional monomeric carboxylic acid.

Provision has been made for sizing compositions comprising a polycarboxylic polymer, a polyol and a catalyst, which catalyst is a phosphorus-comprising catalyst (U.S. Pat. No. 5,318,990, U.S. Pat. No. 5,661,213, U.S. Pat. No. 6,331,350, US 2003/0008978), a fluoroborate (U.S. Pat. No. 5,977,232) or else a cyanamide, a dicyanamide or a cyanoguanidine (U.S. Pat. No. 5,932,689).

A description has also been given of sizing compositions comprising an alkanolamine including at least two hydroxyl groups and a polycarboxylic polymer (U.S. Pat. No. 6,071,994, U.S. Pat. No. 6,099,773, U.S. Pat. No. 6,146,746) in combination with a copolymer (U.S. Pat. No. 6,299,936).

In US 2002/0091185, the polycarboxylic polymer and the polyol are used in amounts such that the ratio of the number of equivalents of OH groups to the number of equivalents of COOH groups varies from 0.6/1 to 0.8/1.

In US 2002/0188055, the sizing composition comprises a polycarboxylic polymer, a polyol and a cationic, amphoteric or nonionic surfactant.

In US 2004/0002567, the sizing composition includes a polycarboxylic polymer, a polyol and a coupling agent of silane type.

In US 2005/0215153, a description is given of a size formed by a prebinder comprising polymer of carboxylic acid and of a polyol, and from a dextrin as cobinder.

Furthermore, an adhesive composition based on heat-crosslinkable polysaccharides which can be used as size for mineral wool is known (U.S. Pat. No. 5,895,804). The composition comprises a polycarboxylic polymer having at least two carboxylic acid functional groups and a molecular weight at least equal to 1000 and a polysaccharide having a molecular weight at least equal to 10 000.

The insulating products based on mineral wool bound by a size must also satisfy standards that especially impose a good resistance to ageing, in particular in a wet environment. It is therefore important for the capacity of the insulating products to absorb water to be as low as possible.

The aim of the present invention is to provide a sizing composition for insulating products based on mineral wool which is devoid of formaldehyde and which gives the insulating products a lower capacity to absorb water.

In order to achieve this aim, the present invention provides a sizing composition for insulating products based on mineral wool, in particular on glass or rock, which comprises:
  at least one saccharide,
  at least one organic polycarboxylic acid having a molar mass of less than or equal to 1000,
  and at least one reactive silicone.

The saccharide may be a monosaccharide, a polysaccharide or a mixture of these compounds.

The monosaccharide is chosen from monosaccharides including from 3 to 8 carbon atoms, preferably aldoses and advantageously aldoses comprising from 5 to 7 carbon atoms. The aldoses which are particularly preferred are natural aldoses (belonging to the D series), in particular hexoses, such as glucose, mannose and galactose.

The polysaccharide in accordance with the invention is chosen from polysaccharides having a weight-average molar mass of less than 100 000, preferably of less than 50 000, advantageously of less than 10 000 and better still of greater than 180.

Advantageously, the polysaccharide exhibits a polydispersity index (PI), defined by the ratio of the weight-average molar mass to the number-average molar mass, which is less than or equal to 10.

Preferably, the polysaccharide includes at least one unit chosen from the abovementioned aldoses, advantageously glucose. The polysaccharides which are predominantly (to more than 50% by weight) composed of glucose units are particularly preferred.

According to a preferred embodiment, the invention uses a mixture of monosaccharide(s) and/or of polysaccharide(s), obtained in particular from plants, especially a dextrin or a molasses.

Dextrins are compounds corresponding to the general formula $(C_6H_{10}O_5)_n$ obtained by partial hydrolysis of starch. The processes for the preparation of dextrins are known. For example, dextrins can be prepared by heating or by drying to dryness a starch, generally in the presence of an acid catalyst, which results in the constituent amylose and amylopectin molecules of the said starch being ruptured to give products of lower molar mass. Dextrins can also be obtained by treating the starch enzymatically with one or more amylases, in particular microbial amylases, capable of hydrolyzing the bonds of the starch. The nature of the treatment (chemical or enzymatic) and the hydrolysis conditions have a direct effect on the average molar mass and the distribution of the molar masses of the dextrin.

The dextrins in accordance with the invention can be obtained from starch or starch derivatives of varied plant origin, for example resulting from tubers, such as potato, manioc, maranta and sweet potato, resulting from grains, such as wheat, corn, rye, rice, barley, millet, oats and sorghum, resulting from fruit, such as horse chestnut, sweet chestnut and hazelnut, or resulting from leguminous plants, such as peas and beans.

Preference is given in particular to dextrins having a dextrose equivalent DE of greater than or, equal to 5, preferably of greater than or equal to 10, advantageously of greater than or equal to 15 and better still of less than 100.

Conventionally, the dextrose equivalent DE is defined by the following relationship:

$$DE = 100 \times \left( \frac{\text{number of glycoside bonds cleaved}}{\text{number of glycoside bonds in the starting starch}} \right)$$

The molasses are residues from the refining of sugar extracted in particular from cane and beet which comprise a high content of glucides, of the order of 40 to 60% by weight. Sucrose constituents the bulk of the glucides of the molasses.

The molasses in accordance with the invention preferably include from 45 to 50% by weight of total glucides, expressed as sucrose.

Beet molasses are particularly preferred.

The term "organic polycarboxylic acid" is understood to mean an organic acid comprising at least two carboxyl functional groups, preferably at most 4 carboxyl functional groups and advantageously at most 3 carboxyl functional groups.

The organic polycarboxylic acid acts as crosslinking agent; it is capable of reacting with the saccharide under the effect of heat to form ester bonds which result in a polymeric network being obtained in the final binder. The said polymeric network makes it possible to establish bonds at the junction points of the fibres in the mineral wool.

The organic polycarboxylic acid is chosen from organic polycarboxylic acids exhibiting a molar mass of less than or equal to 1000, preferably of less than or equal to 750 and advantageously of less than or equal to 500.

Preferably, the organic polycarboxylic acid is a saturated or unsaturated and linear or branched alicyclic acid, a cyclic acid or an aromatic acid.

The organic polycarboxylic acid can be a dicarboxylic acid, for example oxalic acid, malonic acid, succinic acid, glutaric acid, adipic acid, pimelic acid, suberic acid, azelaic acid, sebacic acid, malic acid, tartaric acid, tartronic acid, aspartic acid, glutamic acid, fumaric acid, itaconic acid, maleic acid, traumatic acid, camphoric acid, phthalic acid and its derivatives, in particular comprising at least one boron or chlorine atom, tetrahydrophthalic acid and its derivatives, in particular comprising at least one chlorine atom, such as chlorendic acid, isophthalic acid, terephthalic acid, mesaconic acid and citraconic acid, or a dicarboxylic acid precursor, in particular an anhydride, such as maleic anhydride, succinic anhydride and phthalic anhydride; a tricarboxylic acid, for example citric acid, tricarballylic acid, 1,2,4-butanetricarboxylic acid, aconitic acid, hemimellitic acid, trimellitic acid and trimesic acid; or a tetracarboxylic acid, for example 1,2,3,4-butanetetracarboxylic acid and pyromellitic acid.

In the sizing composition, the saccharide represents from 10 to 90% of the weight of the mixture composed of the saccharide and the organic polycarboxylic acid, preferably from 20 to 85% and advantageously from 30 to 80%.

The expression "reactive silicone" is understood to mean a polyorganosiloxane bearing at least one hydroxyl, carboxyl or anhydride, amine, epoxy or vinyl functional group capable of reacting with at least one of the constituents of the sizing composition.

The reactive silicone is liquid at ambient temperature; it belongs to the category of silicones referred to as silicone fluids. Its average molecular weight is generally less than or equal to 50 000, preferably less than or equal to 10 000.

The reactive silicone is constituted of a main chain composed of organosiloxane residues, especially alkylsiloxane residues, preferably dimethylsiloxane residues and optionally phenylsiloxane residues, especially methylphenylsiloxane residues, in a proportion that preferably does not exceed 20%, especially not more than 10% by weight of phenylsiloxane units relative to the weight of the silicone. Said main chain bears at least one reactive hydroxyl, carboxyl or anhydride, amine, epoxy or vinyl functional group in a terminal position (on one of the free ends of the chain) or on a pendent group (or graft). Preferably, the reactive silicone comprises at least two terminal functional groups, advantageously hydroxyl functional groups.

The reactive hydroxyl, carboxyl or anhydride, amine, epoxy or vinyl functional group of the reactive silicone may be blocked by a protecting group which releases said reactive functional group under the effect of heat. The blocking of reactive functional groups guarantees that the reactive silicone does not react before the heat treatment for crosslinking of the size in the oven. As examples of such protective blocking actions, it is possible to envisage the hydroxyl groups being at least partly in etherified form, or blocked by protecting groups, especially acyl or carbonate groups.

The proportion of reactive silicone in the sizing composition varies from 0.1 to 5 parts by weight, preferably from 0.3 to 3 parts, advantageously from 0.5 to 2 parts and better still from 0.7 to 1.8 parts per 100 parts by weight of saccharide and of organic polycarboxylic acid.

The sizing composition can additionally comprise an acid or basic catalyst which has in particular the role of adjusting the temperature at which crosslinking begins.

The catalyst can be chosen from Lewis bases and acids, such as clays, colloidal or noncolloidal silica, organic amines, quaternary amines, metal oxides, metal sulphates, metal chlorides, urea sulphates, urea chlorides and catalysts based on silicates.

The catalyst can also be a phosphorus-comprising compound, for example an alkali metal hypophosphite salt, an alkali metal phosphite, an alkali metal polyphosphate, an alkali metal hydrogenphosphate, a phosphoric acid or an alkylphosphonic acid. Preferably, the alkali metal is sodium or potassium.

The catalyst can also be a compound comprising fluorine and boron, for example tetrafluoroboric acid or a salt of this acid, in particular an alkali metal tetrafluoroborate, such as sodium tetrafluoroborate or potassium tetrafluoroborate, an alkaline earth metal tetrafluoroborate, such as calcium tetrafluoroborate or magnesium tetrafluoroborate, a zinc tetrafluoroborate and an ammonium tetrafluoroborate.

Preferably, the catalyst is sodium hypophosphite, sodium phosphite and the mixtures of these compounds.

The amount of catalyst introduced into the sizing composition can represent up to 20% of the weight of the saccharide and organic polycarboxylic acid, preferably up to 10%, and advantageously is at least equal to 1%.

The sizing composition in accordance with the invention can additionally comprise the conventional additives below in the following proportions, calculated on the basis of 100 parts by weight of saccharide and organic polycarboxylic acid:

from 0 to 2 parts of silane, in particular an aminosilane,
from 0 to 20 parts of oil, preferably from 4 to 15 parts,
from 0 to 30 parts of urea and/or of glycerol, preferably from 0 to 20 parts,
from 0 to 30 parts of an "extender" chosen from lignin derivatives, such as ammonium lignosulphonate (ALS) or sodium lignosulphonate, and animal or plant proteins.

The role of the additives is known and is briefly restated: the silane is an agent for coupling between the fibres and the binder, and also acts as anti-ageing agent; the oils are dust-preventing and hydrophobic agents; the urea and the glycerol act as plasticizers and make it possible to prevent pregelling of the sizing composition; the "extender" is an organic filler, soluble or dispersible in the aqueous sizing composition, which makes it possible in particular to reduce the cost of the sizing composition.

A non-reactive silicone may optionally be present together with the reactive silicone, especially for formulating reasons or to provide additional hydrophobization; its presence is preferably limited to less than 2 parts, better still to less than 1 part, especially less than 0.5 part by weight based on 100 parts by weight of saccharide and of organic polycarboxylic acid.

The sizing composition exhibits an acidic pH, of the order of 1 to 5 according to the organic polycarboxylic acid used, preferably of greater than or equal to 1.5. Advantageously, the pH is maintained at a value at least equal to 2, so as to limit problems of instability of the sizing composition and of corrosion of the manufacturing line, by virtue of the addition of an amino compound which is incapable of reacting with the saccharide, for example a tertiary amine, in particular triethanolamine. The amount of amino compound can represent up to 30 parts by weight of the total weight of saccharide and of organic polycarboxylic acid.

The sizing composition is intended to be applied to mineral fibres, in particular glass or rock fibres.

Conventionally, the sizing composition is projected onto the mineral fibres at the outlet of the centrifugal device and before they are collected on the receiving member in the form of a web of fibres which is subsequently treated at a temperature which makes possible the crosslinking of the size and the formation of an infusible binder. The crosslinking of the size according to the invention takes place at a temperature comparable to that of a conventional formaldehyde-phenol resin, at a temperature of greater than or equal to 110° C., preferably of greater than or equal to 130° C. and advantageously of greater than or equal to 140° C.

The acoustic and/or thermal insulating products obtained from these sized fibres also constitute a subject-matter of the present invention.

These products are generally provided in the form of a mat or felt of mineral wool, of glass or of rock, or also of a veil of mineral fibres, also of glass or of rock, intended in particular to form a surface coating on the said mat or felt.

The following examples make it possible to illustrate the invention without, however, limiting it.

In these examples, the following are measured:

the thickness of the insulation product after manufacture and after a variable period of compression with a degree of compression (defined as being the ratio of the nominal thickness to the thickness under compression) equal to 6/1 (Examples 1 to 3) or as shown in table 2 (Examples 4 to 8). The thickness measurements make it possible to evaluate the good dimensional behaviour of the product.

the tensile strength according to Standard ASTM C 686-71T on a sample cut out by stamping from the insulating product. The sample has the shape of a torus with a length of 122 mm, a width of 46 mm, a radius of curvature of the cut-out of the outer edge equal to 38 mm and a radius of curvature of the cut-out of the inner edge equal to 12.5 mm.

The sample is positioned between two cylindrical mandrels of a test machine, one of which is moveable and is moved at a constant rate. The breaking force F (in gramforce) of the sample is measured and the tensile strength TS, defined by the ratio of the breaking force F to the weight of the sample, is calculated.

The tensile strength is measured after manufacture (initial tensile strength) and after accelerated ageing in an autoclave at a temperature of 105° C. under 100% relative humidity for 15 minutes (TS 15).

the water absorption under the conditions of Standard EN 1609, expressed as kg of water absorbed per $m^2$ of insulating product. The insulating products exhibiting a water absorption of less than 1 $kg/m^2$ are regarded as having a low short-term (24 hours) water absorption; they belong to the "WS" category according to the ACERMI certification.

EXAMPLES 1 TO 3

Sizing compositions are prepared which comprise the constituents appearing in Table 1, the proportions being expressed as parts by weight.

The sizing compositions are prepared by successively introducing, into a vessel containing water, the saccharide followed by the other constituents with vigorous stirring until the constituents have completely dissolved.

A conventional sizing composition is also prepared including a phenol-formaldehyde resin and urea (Reference) in accordance with Example 2, Test 1, of WO 01/96254 A1.

The sizing compositions are used to form insulation products based on glass wool.

The glass wool is manufactured continuously on a 2.4 m wide production line. The glass wool is formed by the internal centrifugation technique in which the molten glass composition is converted into fibres by means of a tool, referred to as centrifuging disc, comprising a basket forming a chamber for receiving the molten composition and a peripheral band pierced by a multitude of orifices: the dish is rotated about its vertically positioned axis of symmetry, the composition is ejected through the orifices under the effect of the centrifugal force and the material escaping from the orifices is drawn into fibres with the assistance of a drawing gas stream.

Conventionally, a size spraying ring is positioned beneath the fiberizing disc so as to uniformly distribute the sizing composition over the glass wool which has just been formed.

The mineral wool, thus sized, is collected on a belt conveyor equipped with internal extraction boxes which hold the mineral wool in the form of a felt or web at the surface of the conveyor. The felt or the web is cut up and then placed in an oven maintained at 290° C. (260° C. for the Reference product) where the constituents of the size polymerize to form a binder.

The insulating product obtained at the outlet of the oven exhibits a thickness of the order of 82 mm, a density equal to 17.5 $kg/m^3$ and a loss on ignition equal to 5%.

The properties of the insulating products are given in Table 1 below.

TABLE 1

|  | Example | | | |
|---|---|---|---|---|
|  | 1 | 2 | 3 | Ref. |
| Sizing composition | | | | |
| Saccharide[1] | 62.0 | 62.0 | 62.0 | — |
| Citric acid | 38.0 | 38.0 | 38.0 | — |
| Sodium hypophosphite | 5.0 | 5.0 | 5.0 | — |
| γ-aminopropyltriethoxysilane | 1.0 | 1.0 | 1.0 | — |
| Mineral oil | 8.0 | 8.0 | 8.0 | — |
| Reactive silicone[2] | 1.5 | — | — | — |
| Reactive silicone[3] | — | 1.5 | 2.0 | — |
| Insulating product Thickness (mm) | | | | |
| 1 hour | 78.1 | 78.0 | 79.2 | 78.3 |
| 24 hours | 76.8 | 77.0 | 77.0 | 74.0 |
| 30 days | 72.9 | n.d. | n.d. | 72.2 |
| 90 days | 73.1 | n.d. | n.d. | 73.8 |
| Water absorption ($kg/m^2$) | 0.66 | 1.00 | 0.10 | 0.97 | n.d.: not determined
[1]dextrin derived from corn starch; weight-average molecular weight: 3510; dextrose equivalent DE: 30; sold under the reference Roclys ® C3072S by ROQUETTE FRERES.
[2]polydimethylsiloxane with terminal reactive hydroxyl functional groups; sold under the reference DOW CORNING ® 1581 by DOW CORNING.
[3]reactive polydimethylsiloxane; sold under the reference SILRES ® BS 10421581 by WACKER SILICONES.

It is observed that the insulating products in accordance with the invention have, in particular, a low water absorption, comparable to that of the product obtained with the reference phenol-formaldehyde sizing composition for Example 2 and reduced by 32% and 90% for Examples 1 and 3, respectively.

EXAMPLES 4 TO 8

Sizing compositions are prepared under the conditions of Examples 1 to 3 from constituents appearing in Table 2, in the proportions indicated, expressed as parts by weight.

These compositions are used to manufacture insulating products based on mineral wool under the conditions described in Examples 1 to 3. The products obtained have a variable nominal thickness (60, 100 or 160 mm), and a density equal to 19 $kg/m^3$.

The properties of the insulating products are given in Table 2.

The products according to the invention which contain a reactive silicone have a water absorption at most equal to 0.6 $kg/m^2$.

The products from Examples 4 and 5 have a lower capacity to absorb water than the products from Comparative examples 1 and 2 which contain a non-reactive silicone.

TABLE 2

| | Example | | | | | | | |
|---|---|---|---|---|---|---|---|---|
| | 4 | Comparative example 1 | Ref. | 5 | Comparative example 2 | 6 | 7 | 8 |
| Sizing composition | | | | | | | | |
| Saccharide[1] | 62.0 | 62.0 | — | 62.0 | 62.0 | 62.0 | 62.0 | 62.0 |
| Citric acid | 38.8 | 38.8 | — | 38.8 | 38.8 | 38.8 | 38.8 | 38.8 |
| Sodium hypophosphite | 5.0 | 5.0 | — | 5.0 | 5.0 | 5.0 | 5.0 | 5.0 |
| γ-aminopropyltriethoxysilane | 1.0 | 1.0 | — | 1.0 | 1.0 | 1.0 | 1.0 | 1.0 |
| Mineral oil | 8.0 | 8.0 | — | 8.0 | 8.0 | 8.0 | 8.0 | 8.0 |
| Reactive silicone[2] | 1.5 | — | — | 1.5 | — | 1.0 | 1.5 | 1.5 |
| Non-reactive silicone[4] | — | 1.0 | — | — | 1.0 | — | — | — |
| Insulating product Thickness (mm) | | | | | | | | |
| Nominal | 60 | 60 | 60 | 160 | 160 | 100 | 100 | 120 |
| Measured | | | | | | | | |
| Initial (wound-unwound) | 71.6 | 64.2 | 66.3 | 176.9 | 175.7 | 108.1 | 120.6 | 133.8 |
| 15 days | 69.3 | 63.2 | 66.6 | 170.2 | 171.7 | 107.1 | 115.3 | 121.7 |
| 30 days | 70.0 | 61.4 | 65.8 | 162.3 | 165.9 | 108.0 | 111.1 | 116.5 |
| 60 days | 67.5 | 62.6 | 63.9 | 157.9 | 167.9 | n.d. | 112.6 | 116.1 |
| Compression ratio | 2.0 | 2.5 | 2.5 | 2.9 | 2.4 | 2.5 | 2.5 | 2.6 |
| Tensile strength (gf/g) | | | | | | | | |
| Before ageing | 407 | 351 | 407 | 413 | 413 | 361 | 351 | 303 |
| After ageing | 376 | 302 | 376 | 384 | 384 | 306 | 302 | 253 |
| Loss (%) | 8 | 14 | 8 | 7 | 7 | 15 | 14 | 17 |
| Water absorption (kg/m$^2$) | 0.28 | 4.30 | 0.10 | 0.30 | 1.20 | 0.60 | 0.28 | 0.16 | n.d.: not determined

[1]dextrin derived from corn starch; weight-average molecular weight: 3510; dextrose equivalent DE: 30; sold under the reference Roclys® C3072S by ROQUETTE FRERES
[2]polydimethylsiloxane with reactive hydroxyl functional groups; sold under the reference DOW CORNING® 1581 by DOW CORNING.
[4]polydimethylsiloxane; sold under the reference DOW CORNING® 346 by DOW Corning

What is claimed is:

1. A sizing composition for insulating products based on mineral wool, the sizing composition consisting of:
    at least one saccharide,
    at least one organic polycarboxylic acid having a molar mass of less than or equal to 1000,
        wherein the polycarboxylic acid is a non-polymeric polycarboxylic acid selected from:
    (1) a dicarboxylic acid selected from the group consisting of oxalic acid, malonic acid, succinic acid, glutaric acid, adipic acid, pimelic acid, suberic acid, azelaic acid, sebacic acid, malic acid, tartaric acid, tartronic acid, aspartic acid, glutamic acid, fumaric acid, itaconic acid, maleic acid, traumatic acid, camphoric acid, optionally substituted phthalic acid, optionally substituted tetrahydrophthalic acid, isophthalic acid, terephthalic acid, mesaconic acid and citraconic acid; wherein optionally substituted phthalic acid comprises at least one boron or chlorine atom and optionally substituted tetrahydrophthalic acid comprises at least one chlorine atom;
    (2) a dicarboxylic acid precursor selected from the group consisting of maleic anhydride, succinic anhydride and phthalic anhydride;
    (3) a tricarboxylic acid selected from the group consisting of citric acid, tricarballylic acid, 1,2,4-butane-tricarboxylic acid, aconitic acid, hemimellitic acid, trimellitic acid and trimesic acid; or
    (4) a tetracarboxylic acid selected from the group consisting of 1,2,3,4-butanetetracarboxylic acid and pyromellitic acid;
        wherein the non-polymeric polycarboxylic acid is present in an amount of at least 10% of the weight of the mixture of the saccharide plus the at least one polycarboxylic acid
    at least one reactive silicone;
    a catalyst chosen from Lewis acids and bases, phosphorus-containing compounds and compounds comprising fluorine and boron; wherein the catalyst is present up to 20% of the weight of the saccharide and organic polycarboxylic acid;
    additives, calculated on the basis of 100 parts by weight of saccharide and organic polycarboxylic acid:
    from 0 to 2 parts of silane,
    from 0 to 20 parts of oil,
    from 0 to 30 parts of urea and/or of glycerol,
    from 0 to 30 parts of an extender chosen from lignin derivatives, and animal or plant proteins; and
    water.

2. The composition as claimed in claim 1, wherein the saccharide is a monosaccharide, a polysaccharide or a mixture of these compounds.

3. The composition as claimed in claim 2, wherein the monosaccharide is chosen from monosaccharides including from 3 to 8 carbon atoms.

4. The composition as claimed in claim 3, wherein the monosaccharide is an aldose.

5. The composition as claimed in claim 4, wherein the aldose is a hexose.

6. The composition as claimed in claim 2, wherein the polysaccharide exhibits a weight-average molar mass of less than 1,000,000.

7. The composition as claimed in claim 6, wherein the polysaccharide is composed to more than 50% of glucose units.

8. The composition as claimed in claim 1, wherein the at least one saccharide is a mixture of monosaccharide(s) and/or of polysaccharide(s) chosen from dextrins and molasses.

9. The composition as claimed in claim 8, wherein the dextrin exhibits a dextrose equivalent of greater than or equal to 5.

10. The composition as claimed in claim 8, wherein the molasses comprises from 40 to 60% by weight of glucides.

11. The composition as claimed in claim 1, wherein the acid exhibits a molar mass of less than or equal to 750.

12. The composition as claimed in claim 1, wherein the organic polycarboxylic acid is a saturated or unsaturated and linear or branched alicyclic acid, a cyclic acid or an aromatic acid.

13. The composition as claimed in claim 1, wherein the saccharide represents from 10 to 90% of the weight of the mixture composed of the saccharide and the organic polycarboxylic acid.

14. The composition as claimed claim 1, wherein the reactive silicone has a molecular weight less than or equal to 50,000.

15. The composition as claimed in claim 1, wherein the reactive silicone is constituted of a main chain composed of organosiloxane residues and optionally phenylsiloxane-residues.

16. The composition as claimed in claim 1, wherein the reactive silicone bears at least one reactive hydroxyl, carboxyl or anhydride, amine, epoxy or vinyl functional group in a terminal position or on a pendent group.

17. The composition as claimed in claim 16, wherein the at least two terminal functional groups are hydroxyl functional groups.

18. The composition as claimed claim 1, wherein the proportion of reactive silicone varies from 0.1 to 5 parts by weight per 100 parts by weight of saccharide and of organic polycarboxylic acid.

19. An acoustic and/or thermal insulating product based on mineral wool sized using the sizing composition as claimed in claim 1.

20. A veil of mineral fibres sized using the sizing composition as claimed in claim 1.

21. The composition as claimed in claim 1, wherein the mineral wool is based on rock or glass.

22. The composition as claimed in claim 3, wherein the monosaccharide includes from 5 to 7 carbon atoms.

23. The composition as claimed in claim 5, wherein the hexose is glucose, mannose or galactose.

24. The composition as claimed in claim 6, wherein the polysaccharide exhibits a weight-average molar mass of less than 50 000 and greater than 180.

25. The composition as claimed in claim 9, wherein the dextrin exhibits a dextrose equivalent of greater than or equal to 10 and less than 100.

26. The composition as claimed in claim 10, wherein the molasses comprises from 45 to 50% by weight of glucides.

27. The composition as claimed in claim 1, wherein the organic polycarboxylic acid comprises at most four carboxyl functional groups.

28. The composition as claimed in claim 11, wherein the acid exhibits a molar mass of less than or equal to 500.

29. The composition as claimed in claim 13, wherein the saccharide represents from 20 to 85% of the weight of the mixture composed of the saccharide and the organic polycarboxylic acid.

30. The composition as claimed claim 14, wherein the reactive silicone has a molecular weight less than or equal to 10,000.

31. The composition as claimed claim 15, wherein the reactive silicone is constituted of a main chain composed of alkylsiloxane residues and optionally methylphenylsiloxane residues.

32. The composition as claimed claim 18, wherein the proportion of reactive silicone varies from 0.3 to 3 parts by weight per 100 parts by weight of saccharide and of organic polycarboxylic acid.

33. The composition as claimed in claim 1, wherein the catalyst represents up to 10% of the weight of the saccharide and organic polycarboxylic acid.

34. A sizing composition for insulating products based on mineral wool, the sizing composition consisting of:
- at least one saccharide,
- at least one organic polycarboxylic acid having a molar mass of less than or equal to 1000, the at least one organic polycarboxylic acid is a non-polymeric polycarboxylic acid selected from the group consisting of a dicarboxylic acid, a dicarboxylic acid precursor, a tricarboxylic acid, and a tetracarboxylic acid;
- at least one reactive silicone,
    - wherein the composition is provided in a form suitable for the formation of one or more ester bonds between the at least one organic polycarboxylic acid and the saccharide;
- a catalyst chosen from Lewis acids and bases, phosphorus-containing compounds and compounds comprising fluorine and boron; wherein the catalyst is present up to 20% of the weight of the saccharide and organic polycarboxylic acid;
- additives, calculated on the basis of 100 parts by weight of saccharide and organic polycarboxylic acid:
- from 0 to 2 parts of silane,
- from 0 to 20 parts of oil,
- from 0 to 30 parts of urea and/or of glycerol,
- from 0 to 30 parts of an extender chosen from lignin derivatives, and animal or plant proteins; and
- water.

* * * * *